United States Patent [19]

Beshouri

[11] Patent Number: 5,362,762
[45] Date of Patent: Nov. 8, 1994

[54] PROCESS TO PREPARE LOW DENSITY POROUS CROSSLINKED POLYMERIC MATERIALS

[75] Inventor: Sharon M. Beshouri, Houston, Tex.

[73] Assignee: Shell Oil Company, Houston, Tex.

[21] Appl. No.: 226,203

[22] Filed: Apr. 11, 1994

Related U.S. Application Data

[62] Division of Ser. No. 148,141, Nov. 4, 1993.

[51] Int. Cl.$^5$ ................................ C08J 9/28
[52] U.S. Cl. ........................ 521/64; 521/62; 521/63; 521/149
[58] Field of Search .............. 521/64, 62, 63, 149

[56] References Cited

U.S. PATENT DOCUMENTS

| | | |
|---|---|---|
| 3,992,333 | 11/1976 | Emmons et al. . |
| 4,522,953 | 6/1985 | Barby et al. . |
| 4,668,709 | 5/1987 | Jones et al. . |
| 4,683,274 | 7/1987 | Nakamura et al. . |
| 4,788,225 | 11/1988 | Edwards et al. . |
| 5,037,859 | 8/1991 | Williams et al. . |
| 5,147,345 | 9/1992 | Young et al. . |
| 5,149,720 | 9/1992 | DesMarais et al. . |
| 5,189,070 | 2/1993 | Brownscombe et al. . |
| 5,200,433 | 4/1993 | Beshouri . |
| 5,210,104 | 5/1993 | Bass . |

FOREIGN PATENT DOCUMENTS

401694-A  1/1992  Japan .

*Primary Examiner*—Morton Foelak

[57] ABSTRACT

Stable high internal phase water-in-oil emulsions containing polymerizable vinyl monomers, crosslinking monomers and initiators, useful in preparing low density porous crosslinked polymeric foams, are obtained by using a surfactant system containing (a) one or more sorbitan fatty acid ester or saccharide fatty acid ester and (b) a glycerol monofatty acid ester. A higher water to oil ratio water-in-oil emulsions can be formed with the same formulation by using the glycerol monofatty acid ester cosurfactant.

6 Claims, No Drawings

5,362,762

PROCESS TO PREPARE LOW DENSITY POROUS CROSSLINKED POLYMERIC MATERIALS

This is a division of application Ser. No. 08/148,141, filed Nov. 4, 1993.

FIELD OF INVENTION

This invention relates to a process to prepare low density, porous, crosslinked, polymeric materials. In one aspect, the invention relates to improved surfactant systems for a high internal phase emulsion polymerization process to manufacture low density porous crosslinked polymeric materials.

BACKGROUND OF THE INVENTION

Polymeric foams can be generally classified as either closed-cell foams or as open-cell foams. Open-cell foams can be used as a matrix to contain various liquids and gases. They are capable of various industrial applications such as, for example, use in wipes and diapers, as carriers and ion exchange resins. For some of these applications, it is desirable to have porous crosslinked polymer blocks which have a very low density and a high capacity of absorbing and retaining liquids. Such high absorption capacity, low density, porous polymer blocks can be prepared by polymerizing a specific type of water-in-oil emulsion known as high internal phase emulsion (HIPE) having relatively small amounts of a continuous oil phase and relatively greater amounts of an internal water phase.

Such high absorption capacity, low density foams are prepared in U.S. Pat. No. 4,522,953 by polymerizing and crosslinking the monomers in the continuous oil phase of a high internal phase water-in-oil emulsion with a polymerization initiator such as potassium persulfate. Generally, these high internal phase water-in-oil emulsions contain at least 90 weight percent of an aqueous liquid as the internal phase. The high ratio water-in-oil emulsions are formed by combining the oil phase with water under moderate shear. In order to obtain this high internal phase water-in-oil emulsion, a surfactant must be used to stabilize the inverse emulsion.

One class of surfactants used to produce foams by such processes are sorbitan fatty acid esters. Commercial sorbitan fatty acid esters are a combination of mono-, di-, tri-, and tetra-fatty acid esters (generally $C_8$-$C_{18}$) of sorbitan $C_6(H_2O)_5H_2$, as well as mono- and di-fatty acid esters of isosorbide $C_6(H_2O)_4H_2$ and polyol impurities.

The stability of the emulsion is directly tied to the surface activity of the emulsifier. A robust emulsifier will stabilize emulsions up to high (30:1) water:oil ratios. A poor emulsifier will not, and at high water to oil ratios the emulsion will degrade by not incorporating water, and eventually break completely.

One method of enhancing the emulsifier is to combine different sorbitan fatty acid esters as reported in U.S. Pat. No. 5,200,433. However, it is desirable to further enhance the emulsion stability to obtain higher ratio water-in-oil emulsion increasing the overall absorption capacity.

It is therefore an object of the present invention to provide a more effective surfactant system for the preparation of a high internal phase water-in-oil emulsion for the preparation of a low density crosslinked polymeric material.

SUMMARY OF THE INVENTION

According to the invention, a process for the production of a porous crosslinked polymeric material is provided, comprising the steps of:

(a) providing a water-in-oil emulsion comprising (i) a mixture of polymerizable monomers comprising at least one oil-soluble vinyl monomer and from about 2 to about 70 weight percent, based on the mixture, of a multifunctional unsaturated crosslinking monomer, (ii) at least 90 weight percent, based on the emulsion, of water as the internal phase (iii) a surfactant comprising (A) one or more sorbitan fatty acid ester and/or saccharide fatty acid ester and (B) at least one glycerol monofatty acid ester, and (iv) a polymerization initiator; and (b) heating the water-in-oil emulsion under conditions effective to polymerize and crosslink the polymerizable monomers. The curable high internal phase water-in-oil emulsion is also provided.

DETAILED DESCRIPTION OF THE INVENTION

It has been found that by adding a glycerol monofatty acid ester cosurfactant to the sorbitan fatty acid ester or saccharide fatty acid ester surfactant in a curable high internal phase water-in-oil emulsion, it increases emulsion stability such that higher water to oil ratio emulsions are achievable. These stable curable high internal phase water-in-oil emulsions are useful in forming low density porous crosslinked polymeric materials (hereinafter "foam"). These foams generally have a dry density of less than about 0.1 g/cc. In many cases, the foam which resulted from addition of the glycerol monofatty acid ester cosurfactant produced a foam which overall has properties more favorable as an absorbent polymeric foam such as increased strength, improved capacity under load and increased absorbency.

In one embodiment of the inventive process, a foam is produced by first forming a curable water-in-oil high internal phase emulsion by gradually adding and mixing an aqueous solution optionally containing an electrolyte into a monomer solution (oil phase) containing a mixture of polymerizable monomers and the surfactant mixture containing (a) one or more sorbitan fatty acid ester, saccharide fatty acid ester, or a mixture thereof and (b) one or more glycerol fatty acid ester. A polymerization initiator is also added either in the monomer solution or the aqueous solution before mixing or after formation of the emulsion depending on the desired process conditions. The curable water-in-oil high internal phase emulsion is cured (polymerized and crosslinked) by heating the emulsion at a temperature of at least about 25° C. for a time effective to cure the monomers.

The mixture of polymerizable monomers generally contains one or more vinyl monomers and one or more crosslinking agents. Various monomers may be used in the preparation of the foams, provided the monomers can be dispersed in or form an oil phase of a water-in-oil high internal phase emulsion ("oil-soluble") and have a polymerizable vinyl group. Suitable vinyl monomers include, for example, monoalkenyl arene monomers such as styrene, α-methylstyrene, chloromethylstyrene, vinylethylbenzene and vinyl toluene; acrylate or methacrylate esters such as 2-ethylhexyl acrylate, n-butyl acrylate, isobutyl acrylate, t-butyl acrylate, hexyl acrylate, n-butyl methacrylate, lauryl methacrylate, and isodecyl methacrylate; conjugated diolefins such as butadiene and isoprene; allenes such as allene, methyl allene and chloroallene; olefin halides such as vinyl chloride, vinyl fluoride and polyfluoro-olefins; and mixtures thereof.

Suitable crosslinking agents can be any multifunctional unsaturated monomers capable of reacting with the vinyl monomers. The crosslinking agents contain at least two functionality. The functionality can be for example, vinyl groups, acrylate groups and methacrylate groups. Multifunctional unsaturated crosslinking monomers include, for example, difunctional unsaturated crosslinking monomers such as divinyl benzene, diethylene glycol dimethacrylate, 1,3-butanediol dimethacrylate, and allyl methacrylate and tri-, tetra-, and penta-functional unsaturated crosslinking monomers such as tetramethacrylate, trimethylolpropane triacrylate, and pentaerythritol tetraacrylate, glucose pentaacrylate, glucose diethylmercaptal pentaacrylate, and sorbitan triacrylate; and poly-functional unsaturated crosslinking monomers such as polyacrylates (e.g. sucrose per(meth)acrylate and cellulose (meth)acrylate). Crosslinking monomers are typically present in an amount of from about 2 weight percent to about 70 weight percent, preferably from about 5 weight percent to about 40 weight percent based on the total monomer mixture. Some of these crosslinking monomers can be incorporated as a non-crosslinked monomer as long as at least about 2 weight percent of the crosslinking monomers are crosslinked.

Suitable polymerization initiators can be water-soluble or oil-soluble. Water-soluble initiators include, for example, persulfates such as potassium or sodium persulfate and various redox systems such as ammonium persulfate together with sodium metabisulfite. Oil soluble (monomer soluble) initiators include, for example, azo compounds such as azobisisobutyronitrile (AIBN); and peroxides such as benzoyl peroxide, methyl ethyl ketone peroxide, alkylperoxycarbonates such as di-2-ethylhexyl peroxydicarbonate and di(secbutyl)peroxydicarbonate and alkylperoxycarboxylates such as t-butyl peroxyisobutyrate, 2,5-dimethyl-2,5-bis(2,3-ethylhexanoylperoxy)hexane, and t-butyl peroctoate. The preferred water-soluble polymerization initiator is potassium persulfate and the preferred oil-soluble polymerization initiators are alkylperoxycarbonates and alkylperoxycarboxylates for fast curing time.

Most preferable alkylperoxycarbonates are branched at the 1-carbon position and most preferable alkylperoxycarboxylates are branched at the α-carbon position and/or 1-carbon position. These branched alkylperoxycarbonate peroxide can be represented by the formula:

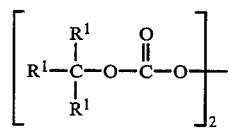

where $R^1$ is independently $C_1$ to $C_{16}$ hydrocarbons or hydrogen in which at least two of the $R^1$ are hydrocarbon groups.

The preferred branched alkyl carboxylate peroxide can be represented by the formula:

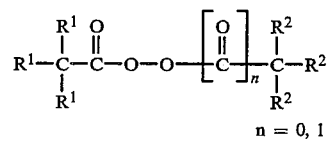

$n = 0, 1$ where $R^1$ and $R^2$ are independently $C_1$ to $C_{16}$ hydrocarbon groups or hydrogen in which at least two of the $R^1$ or $R^2$ are hydrocarbon groups. Preferably at least two of both $R^1$ and $R^2$ are an hydrocarbon groups. Hydrocarbon groups can be alkyl, alkenyl or aryl groups.

The water-soluble initiators and/or oil-soluble initiators should be present in an effective amount to cure (polymerize and to crosslink) the monomers. Typically the initiator can be present from about 0.005 to about 15 weight percent based on the monomers. The initiators can be introduced with the oil phase or the aqueous phase before or after formation of the high internal phase emulsion.

A water-soluble initiator such as potassium persulfate can be added to the aqueous solution before forming the emulsion or to the emulsion. An oil-soluble initiator can be added to the monomer solution or an advanced monomer solution or to the emulsion. Addition of a polymerization initiator to an high internal phase water-in-oil emulsion is described in U.S. Pat. No. 5,210,104, the disclosure of which is herein incorporated by reference. The initiator added to the emulsion can optionally be blended into the emulsion by any blending technique such as, for example, static mixer or a pin mixer at a low shear rate, to form a curable water-in-oil high internal phase emulsion. The rate of shear must be high enough to blend the initiator but low enough not to allow the emulsion to coalesce or liquify.

Conveniently, the initiators can be added to the oil phase (monomer phase) or aqueous phase prior to formation of the emulsion. Alternatively, at least a portion of the monomer solution can be advanced (partially polymerized) in the presence of an effective amount of an advancement initiator or by a free-radical-producing radiation source to produce an advanced monomer component prior to formation of the emulsion to reduce curing time.

As the advancement initiator any oil-soluble initiator listed above can be used. For advancing the monomer solution, the oil-soluble initiator-containing monomer solution is generally heated at a temperature within the range of above 25° C. to about 150° C. Suitable free-radical-producing radiation sources are gamma rays, electron beams, neutrons, ultra-violet or other agents capable of inducing free-radical formation. The monomers will generally be exposed to the free-radical-producing radiation source until suitable viscosity is reached.

The advancement can be carried out on one or more or all of the monomer component(s). It is particularly advantageous to advance monomer component(s) when one or more of the monomers is volatile at the curing temperature.

When advanced, preferably the monomer mixture is advanced to a time sufficient to polymerize some monomers but not so long that the monomer mixture solidifies and no longer deforms. Typically, the monomer mixture is advanced for a time of 5% to 95%, preferably 10% to 90%, of the time necessary to form a solid (when the monomer mixture no longer deforms) or until the viscosity ratio of advanced mixture (numerator) to unadvanced, fresh mixture (denominator) is greater than 1.00, preferably within the range from about 1.03 to about 50, more preferably from about 1.07 to about 30. The time necessary to form a solid can be conveniently measured by a Solidity Test described below. The viscosity is expressed as a ratio between the viscosity of the monomer mixture and that of the advanced monomer mixture, or the viscosity of the advanced monomer mixture plus surfactant and the unadvanced mixture plus surfactant, because the absolute viscosity values are a function of temperature and whether or not the surfactant has been added to the mixture (normally addition of the surfactant raises the viscosity several-fold). Since the viscosities are generally low, it is convenient to measure them at $-78°$ C. as described below.

Additional monomers can optionally be added to the advanced monomer solution prior to emulsification to form an advanced monomer mixture. Alternatively, the advanced monomer solution can be added to a high internal phase water-in-oil emulsion containing other monomers.

The surfactant system of the invention can be added before or after advancement (in the oil phase) or in the monomer (oil phase) solution without advancement. When the monomer solution is advanced, the emulsion is formed with the advanced monomer solution. When less effective polymerization initiators such as benzoyl peroxide, AIBN or methyl ethyl ketone peroxide are used as advancement initiators, additional polymerization initiators which can be an oil-soluble or a water-soluble initiator may be necessary to completely cure the foam. The additional polymerization initiator can be added in the aqueous solution or in the emulsion. The added polymerization initiator can optionally be blended into the emulsion by any blending technique such as, for example, static mixer or a pin mixer at a low shear rate, to form a curable water-in-oil high internal phase emulsion as described above.

The surfactant used in making the high internal phase emulsion which is to be polymerized is important in forming water-in-oil high internal phase emulsion and the final properties of the foams obtained. The surfactants are typically added to the monomer phase (oil phase). In the inventive process, the surfactant system contains component (a) at least one saccharide fatty acid ester or a sorbitan fatty acid ester (can be a mixture thereof) and component (b) at least one glycerol monofatty acid ester.

The preferred sorbitan fatty acid esters for component (a) is a fatty acid ester of a sorbitan having the formula $C_6(H_2O)_5H_2$. Preferably the sorbitan fatty acid esters have at least one fatty acid ester moiety having $C_8$ to $C_{30}$ hydrocarbyl segment, more preferably $C_{12}$ to $C_{20}$ hydrocarbyl segment. These hydrocarbyl segments can be alkyl (straight or branched), aryl, cyclic or arylalkyl. The fatty acid esters can contain other inert substituents. The preferred sorbitan fatty acid esters include, for example, sorbitan monooleate, sorbitan monolaurate, sorbitan monopalmitate, sorbitan trioleate, sorbitan monostearate and sorbitan tristearate. Commercially available sorbitan fatty acid ester surfactants include, for example, SPAN ® emulsifying agents 20, 40, 60, 65, 80 and 85 (from Fluka Chemical Corp. or Aldrich Chemical Co.), EMSORB 2502 (from Henkel) and ALKAMULS ® sorbitan esters SML, SMO, SMS, STO (from Alkaril Chemicals Ltd.) among others. A combination of sorbitan esters such as a combination of SPAN ® 20 and 40 emulsifying agents can also be used. In particular when a hydrophilic foam is desired, one or more sorbitan fatty acid ester is preferred.

For component (a), saccharide fatty acid ester surfactant can be monosaccharides or oligosaccharides. Monosaccharides are polyhydroxy aldehydes or ketones having the general chemical formula $C_n(H_2O)_n$ where n is 3, 4, 5, 6, 7, 8, 9 or 10. Examples of monosaccharides where n is 6 are D-glucose, D-fructose, D-mannose and D-galactose. Oligosaccharides are combinations of two or more saccharides joined by O-glucoside linkages having the general chemical formula $C_m(H_2O)_{m-r}$ where m is an integer from 6 to 40 and r is the number of O-glucoside linkages (or number of monosaccharide molecules that form the oligosaccharide minus one). Examples of commonly occurring disaccharides are sucrose (D-glucose plus D-fructose), lactose (D-galactose plus D-glucose), and maltose (D-glucose plus D-glucose). Each of these molecules have the general chemical formula $C_{12}(H_2O)_{11}$. Raffinose is an example of a commonly occurring trisaccharide (D-glucose plus D-fructose plus D-galactose) and has the chemical formula $C_{18}(H_2O)_{16}$.

Monosaccharides and oligosaccharides can be partially esterified with fatty acids to obtain the saccharide fatty acid esters. One method to esterifying saccharides is by transesterification between the saccharide and an ester, whereby an acyl group is transferred to saccharide in the presence of a basic catalyst, e.g., potassium carbonate. For a typical saccharide, esterification with fatty acid esters preferably occurs at the methyl hydroxy side chain groups and the saccharide fatty acid esters produced can contain a mixture of esters. For example, sucrose fatty acid esters can contain a mixture of the mono-, di-, tri- esters.

The preferred saccharide fatty acid ester is a fatty acid ester of a saccharide having the formula $C_n(H_2O)_{n-r}$, wherein r is an integer from 0 to 3 and $3(r+1) \leq n \leq 10(r+1)$ (n is an integer from 3 to 40, more preferably from 3 to 32). More preferably the saccharide segment of the surfactant is a monosaccharide (r=0), disaccharide (r=1), trisaccharide (r=2). Preferably the saccharide fatty acid esters have at least one fatty acid ester moiety having $C_8$ to $C_{30}$ hydrocarbyl segment, more preferably $C_{12}$ to $C_{20}$ hydrocarbyl segment. These hydrocarbyl segments can be alkyl (straight or branched), aryl, cyclic or arylalkyl. The fatty acid esters can contain other inert substituents. Preferred monosaccharide and oligosaccharide fatty acid ester surfactants for preparing high internal phase, water-in-oil emulsions have ester values within the range of about 100 to about 250 mg KOH/g and hydroxyl values are within the range of about 100 to about 500 mg KOH/g. Foams containing saccharide fatty acid ester surfactants are generally hydrophobic.

Some specific examples of commercially available saccharide fatty acid ester surfactants are Crodesta F-50 emulsifying agent (sucrose distearate from Croda Inc.) and Crodesta F-110 emulsifying agent (sucrose mono-,di-stearate from Croda Inc.). Some other suitable fatty acid esters are sucrose dilaurate, sucrose dioleate, sucrose dipalmitate, fructose monopalmitate, fructose dipalmitate, glucose monodecanoate, glucose monooctanoate, glucose dioctanoate, lactose dilaurate, maltose monolaurate, maltose dilaurate, mannose monodecanoate, mannose didecanoate, arabitol fatty acid esters, mannitol fatty acid esters, xylitol fatty acid esters, erythritol monooleate, mannitol monolaurate, and xylitol dioleate.

Partially alkylated derivatives of the above mentioned monosaccharide and oligosaccharide fatty acid ester surfactants can also be used and are included in the definition of saccharide fatty acid ester surfactants. In the alkylated derivatives, the hydroxyl positions of the monosaccharide or oligosaccharide fatty acid ester is partially alkylated with a lower alkyl group, preferably $C_{1-6}$, more preferably $C_{1-3}$, and most preferably $C_1$ alkyl group (i.e., methylated). For example, the methylated derivatives are methylated in the hydroxyl positions of the saccharides. These alkyl saccharide fatty acid esters can be used as mixtures with non-alkylated saccharide fatty acid esters or with sorbitan fatty acid esters. These alkyl saccharide fatty acid esters (or saccharide ether fatty acid esters) are known, for example, in Japanese patent specification 04016194-A and Adelhorst, K. et al., *Synthesis*, (2), 112–15 (1990). Some specific examples of commercially available surfactants are Glucate ® SS (methyl glucose sesquistearate from Amerchol Corp.), Glucate ® DO (methyl glucose dioleate from Amerchol Corp.), Grillocose PS (methyl glucose stearate from R.I.T.A. Corp.) and Grillocose IS (methyl glucose isostearate from R.I.T.A. Corp.) emulsifying agents. Some other preferred alkyl saccharide fatty acid esters include ethyl glucopyranoside didodecanoate, ethyl glucopyranoside dioctadecanoate, ethyl galactopyranosyl glucopyranoside didodecanoate, ethyl galactopyranosyl glucopyranoside monododecanoate, methyl mannoside didodecanoate.

The component (a) can also contain one or more sorbitan fatty acid ester alone or in addition to the saccharide fatty acid ester. In particular when a hydrophilic foam is desired, one or more sorbitan fatty acid ester is preferred. Optionally the combinations of saccharide fatty acid esters and sorbitan fatty acid esters can be used.

The component (b) preferably is a glycerol monofatty acid ester having a $C_8$–$C_{30}$ ester group, more preferably $C_{12}$–$C_{22}$ ester group. The ester group of the glycerol monofatty acid ester can optionally be substituted with inert substituent such as hydroxyl groups. Examples of the glycerol fatty acid ester includes glycerol monooleate (monoolein), glycerol monopalmitate, glycerol monolaurate, glycerol monostearate and glycerol monoricinoleate, and mixtures thereof. The term glycerol monofatty acid ester includes mixtures of fatty acid esters of glycerol containing major amounts (glycerol monofatty acids present in largest quantity among total glycerol fatty acid esters), more preferably predominantly (greater than 50 weight percent based on total glycerol fatty acid esters), of glycerol with one fatty acid ester substituent. It may contain some glycerol di- or tri-fatty acid esters.

Glycerol fatty acid esters can be obtained by the reaction of fatty acids or raw or hydrogenated oils, such as cottonseed and coconut, with an excess of glycerol or polyglycerols. Some specific examples of commercially available glycerol monofatty acid esters are Aldo MLD (glycerol monolaurate from Lonza Inc.), Caplube 8350 (glycerol monooleate from Karlshamms USA, Inc.), Emerest ® 2400 (glycerol monostearate from Henkel Inc.), Drewmulse GMO (glycerol monooleate from Stepan Co.) and Witconol TM MST (glycerol monostearate from Witco Corp.).

The amount of surfactant system must be such that a water-in-oil high internal phase emulsion will form. Generally, the surfactant system is present in an amount effective to form a water-in-oil high internal phase emulsion (HIPE). Preferably, the surfactant system can be present from about 0.1 to about 40 weight percent, more preferably about 0.1 to about 25 weight percent based on the monomers. When saccharide fatty acid esters are used as component (a), the saccharide fatty acid surfactants are preferably present from about 0.1 weight percent to about 36 weight percent, more preferably from about 0.1 to about 25 weight percent based on the monomers. When sorbitan fatty acid esters are used as component (a), the sorbitan fatty acid ester surfactants are preferably present from about 2 weight percent to about 36 weight percent, more preferably from about 5 weight percent to about 25 weight percent based on the monomers.

The ratio of primary surfactant component (a) to cosurfactant component (b) is preferably within the range of from about 20:1 to about 1:1, preferably from about 15:1 to about 2:1.

The relative amounts of the aqueous phase containing water and an electrolyte and monomer phase containing monomer mixtures and surfactants used to form the high internal phase emulsions are a factor in determining the structural, mechanical and performance properties of the resulting polymeric foams. The ratio of water and oil in the emulsion can influence the density, cell size, and specific surface area of the foam products. To form a polymeric foam product with suitable density and high absorption capacity, the water-in-oil high internal phase emulsion (HIPE) typically contains as the internal phase, at least about 90 weight percent, based on the emulsion, of water, corresponding to a water to oil weight ratio of at least about 9:1, more preferably at least about 95 weight percent of water, most preferably at least about 97 weight percent of water, corresponding to a water to oil weight ratio of at least about 33:1.

The internal aqueous phase can preferably contain a water-soluble electrolyte to stabilize the HIPE and to make the foam more water wettable. Suitable electrolyte includes inorganic salts (monovalent, divalent, trivalent or mixtures thereof), for example, alkali metal salts, alkaline earth metal salts and heavy metal salts such as halides, sulfates, carbonates, phosphates and mixtures thereof. Such electrolyte includes, for example, sodium chloride, sodium sulfate, potassium chloride, potassium sulfate, lithium chloride, magnesium chloride, calcium chloride, magnesium sulfate, aluminum chloride and mixtures thereof. Mono- or divalent salts with monovalent anions such as halides are preferred.

The formation of a water-in-oil high internal phase emulsion is dependent on a number of factors such as the monomers used, water to oil ratio, type and amount of surfactant used, mixing conditions, presence and the amount of water-soluble electrolyte. Unless all of these factors are such that it favors formation of a water-in-oil emulsion, the emulsion will form an oil-in-water emulsion rather than water-in-oil high internal phase emulsion. It has been found that by adding the glycerol monofatty acid ester to a primary surfactant such as sorbitan fatty acid ester or saccharide fatty acid ester, a more stable emulsion can be formed and higher water to oil ratio can be achieved resulting in higher fluid absorption capacity foams.

The formation of a water-in-oil emulsion is described in U.S. Pat. No. 4,522,953, the disclosure of which is herein incorporated by reference. In general, to form the water-in-oil emulsion, the water can be mixed in any way up to a water to oil ratio of about 4:1. An oil-in-water emulsion becomes preferred if the water was added all at once beyond a water to oil ratio of about 4:1. Typically, the water must be added gradually with a moderate rate of shear. A small capacity mixer such as a paint mixer with a shear rate of at least about $5 s^{-1}$, preferably at least about $10 s^{-1}$ can be used to mix the water-in-oil emulsion. A larger mixer equipped with an impeller with a shear rate of at least about $10 s^{-1}$ or a pin gap mixer with a shear rate of at least about $50 s^{-1}$, preferably at least about $100 s^{-1}$ can also be used. If the shear rate is too low, the water-in-oil emulsion will revert to an oil-in-water emulsion. It is desirable to at least have a water to oil ratio of about 9:1, preferably at least about 19:1, more preferably at least about 30:1 for a high absorbency capacity foam.

An HIPE can be prepared in batches or continuously. To form an HIPE in batches, the emulsion is formed in a vessel or a container by gradually adding an aqueous phase in a monomer mixture and/or advanced monomer mixture under moderate rate of shear until the desired water to oil ratio is reached.

An HIPE can be prepared continuously by initially preparing a preformed emulsion of approximately the same character as the desired emulsion by the method described above, then introducing into the preformed emulsion, both the aqueous phase and/or advanced monomer mixture of the emulsion in such proportions so as to produce the desired emulsion. The emulsified mass is maintained in a state of continuous shear sufficient to reduce the effective viscosity of the mass near to that of the introduced phase but not above the inherent shear stability point of the desired emulsion, and then withdrawing the prepared emulsion at the desired rate.

The aqueous phase and the monomer and/or advanced monomer phase for batch process and continuous process can be introduced in a mixing vessel by an aqueous stream or a monomer stream, respectively, through one or more inlets. The streams can be combined prior to or after entering the mixing vessel then mixed in such a way to produce the desired HIPE. The mixing vessel is any container in which the high internal phase emulsion is made regardless of the type of mixer or mixer head used.

The curable water-in-oil high internal phase emulsions (curable HIPE) can be cured in a batch process or in a continuous process. The emulsion or aqueous stream or monomer stream can be heated prior to or after the addition of the initiator.

In a batch process, the curable HIPE is collected in a suitable container with the desirable shape and cured at a temperature at least about 25° C. for a time effective to polymerize and to cure the monomers. The HIPE is preferably polymerized and cured at a temperature within the range of about 25° C. to about 90° C., as long as the emulsion is stable at the curing temperature. Alternatively, a multiple-step process as described in a U.S. Pat. No. 5,189,070 issued Feb. 23, 1993 can also be used, the disclosure of which is herein incorporated by reference. In the multi-step process the emulsion is pre-cured at a temperature of less than about 65° C. until the emulsion has a Rheometrics dynamic shear modulus of greater than about 500 pascal, (lightly gelled, having a consistency like a jelly or a gelatin referred to as "gel"), then cured at a temperature of above about 70° C. for a time effective to cure the gel. The cure can be as high as about 175° C. under suitable pressure to prevent water from boiling.

The emulsions can be heated, for example, by hot water, hot air, steam, IR, RF, microwave or ohmic heating. The HIPE should be cured until the desired properties are obtained. Typically, to obtain a cured foam, the HIPE should be cured for at least about 8 hours at 60° C. or at least about 1 hours at 60° C. then 3 hours at a temperature of above about 70° C. Generally, the extent of reaction after curing is at least about 85% of the monomers, preferably at least about 90%, more preferably at least about 95% (i.e., less than about 5% of free monomers), most preferably at least about 99% (i.e., less than about 1% of free monomers) in order to obtain good properties.

These foams can be optionally post-cured to improve the foam properties. Post-curing of the foam can be carried out by heating the foams at a temperature of above about 75° C., preferably greater than 90° C. by steam, hot air or other heating source. Such heating may be performed initially in a heat exchanger, oven, over heated rollers or by other means.

When the temperature is near or above the boiling point of water, pressure is preferably applied to keep the water in the liquid phase. Pressure can be applied to the emulsion, if desired, at a pressure generally from above atmospheric pressure, typically within the range of about atmospheric pressure to about 1.03 MPa (150 psig). When the temperature is about 100° C., a pressure from about 7 to 70 kPa gauge (about 1 to 10 psig) is sufficient; when the temperature is about 130° C., a pressure from about 210 to 480 kPa gauge (about 30 psig to 70 psig) is preferred. The preferred pressures will be from just above the autogenous steam pressure of the solution to about twice that pressure on an absolute pressure basis, i.e., psia. For example, the emulsion can be cured under pressure by using an autoclave operating under autogenous pressure of steam generated from pure water at a given temperature, by applying nitrogen or air pressure to prevent boiling of the emulsion or by mechanical means, such as rollers, pistons, molds, or the like.

Once the curing and/or post-curing process is completed, the water incorporated in the foam may be removed or squeezed out, dried by heat or flashed by lowering the pressure to a suitable level to evaporate the remaining liquid to give the desired degree of dryness in the product foam. These drying techniques will preferably be used after the desired state of cure is developed in the foam material.

These foams prepared by the inventive process may be washed prior to, after or between drying stages to yield an absorbent block which is especially useful for the absorption of liquids. Typically, these foams are washed to reduce the electrolyte content of the foam with a solvent such as, for example, an alcohol, a low concentration electrolyte solution (lower concentration than the water phase) such as 1% calcium chloride solution or deionized water. The washed foams can be conveniently dried by squeezing the water and/or solvent out of the foams and air or heat drying.

The foams produced by the inventive process possess high absorption capacities and good uniform properties especially suitable for use as liquid absorbent articles such as wipes, diapers and catamenial products for example.

Illustrative Embodiment

The following illustrative embodiments describe the process of the invention and are provided for illustrative purposes and are not meant as limiting the invention.

The surfactants utilized were SPAN® 20 (sorbitan monolaurate) and SPAN® 40 (sorbitan monopalmitate) emulsifying agents from Fluka Chemical Corporation or Aldrich Chemical Company. Cosurfactant utilized was monoolein (glycerol monooleate) from Lonza Inc. A commercial divinyl benzene containing 55% divinyl benzene from Aldrich Chemical Company was used. The quantity of monomer phase made in one batch was between 1–3 liters.

Examples 1–25 demonstrate the process of the invention using a cosurfactant system. The surfactant contains a sorbitan fatty acid ester as the primary surfactant and glycerol monooleate as the cosurfactant. Comparative Examples 1–19 are provided where no cosurfactants were used. Comparative Example 20 has only glycerol monooleate as the surfactant.

Washing and Drying Method

The following washing and drying method was used for all of the examples below: After the foam blocks were cured, the blocks were sliced to 0.35 inches (0.89 cm) thickness. Then, each individual slice was placed on a 0.04 inch (0.1 cm) mesh screen between a 9″×6.75″ (22.9 cm×17.1 cm) stainless steel plate that allowed the slice to be squeezed to a 0.045 inch (1.14 mm) thickness. The squeezed slices were placed in an Arbor-press made by DAKE and the calcium chloride solution was squeezed out. The slices were then washed and squeezed twice by soaking the slices in 7.6 liters (2 US gallons) of 1% calcium chloride solution and placing in the Arbor-press. Then, after the slices were squeezed, a paper towel was placed on both sides of the washed slices which were squeezed again to remove excess water from the slices. The slices were then placed in an oven at a temperature of 60° C. for 4 hours to dry. The washed and dried foam slices were analyzed for physical properties as discussed below.

TESTING METHODS

Free Swell ("FS")/Percent Recovery/Foam Density ("FD")/Percent Strain/Resistance to Compression Deflection ("RTCD")/Swell Ratio:

A 2″×2″ (5.08×5.08 cm) square is cut from a foam slice. The thickness of the foam sample is measured while it is dry ("dry thickness") using a dead weight thickness gage (a digital linear gage model EG-225 made by Ono Sokki) exerting 50 grams force applied to a 1.60″ diameter disk. This thickness is called the "caliper." The foam square is soaked in warm 88° F. (31° C.) Syn-Urine from Jayco for 17 minutes. From the 2″×2″ (5.08×5.08 cm) square, a circle of 1.129″ (2.868 cm) diameter is cut. This disk is re-equilibrated in the Syn-Urine for 5 minutes. The wet disk is then weighed ("initial wet weight").

The thickness of the wet sample is measured using the same load gage ("initial wet caliper"). The disk is then placed under a 0.74 psi stress where stress is the total dead weight applied to the gage divided by the cross-sectional area. The thickness of the disk is measured under this stress after 15 minutes ("wet caliper"). After 15 minutes, the specimen disk is weighed to measure the retained fluid.

The excess urine is squeezed from the disk and the remainder of the square from which it was cut. The foam is placed in boiling deionized water for 15 minutes. The foam is washed this way several times to remove inorganics. The foam is then removed, blotted dry, then placed in a vacuum oven at 60°–70° C. and dried until the foam has fully expanded. The weight of the dry disk sample is then determined in grams ("final dry weight").

The following values were calculated from the above measurements.

Free swell=initial wet weight/final dry weight
Resistance to Compression Deflection ("RTCD")=wet weight after load at 15 minutes/final dry weight
Swell Ratio=RTCD/Free swell×100

$$\% \text{ Strain} = \frac{\text{initial wet caliper} - \text{wet caliper}}{\text{initial wet caliper}} \times 100$$

Foam Volume $(cm^3)=(\text{diameter}/2)^2 \times 3.142 \times$ initial wet caliper based on a 1.129″ diameter circle cut (in cm)

Foam Density $(mg/cm^3)=$ final dry weight×1000/Foam Volume

% Recovery=dry thickness/initial wet caliper×100

Vertical Wicking Time ("VWT"):

From a foam slice, cut at 0.35 inches (0.89 cm) thickness, a 1 to 2 cm wide strip is cut, greater than 5 cm in length. The strip of foam is clamped or taped to a metal ruler, with the bottom of the foam strip flush with the 0 mark on the ruler. The ruler and foam are placed in a container of approximately 100 ml Syn-Urine from Jayco, in an incubator at 99° F. (37° C.) so the bottom of the strip (0 mark) is barely touching the surface of the Syn-Urine (less than 1 mm). The Syn-Urine is dyed with food coloring to more easily monitor its absorption and rise in the foam. A stopwatch is used to measure the time required for the liquid level to reach 5 cm vertical height in the foam sample.

Percent Free Liquid:

The amount of unabsorbed water was measured by decanting fluid from the foam in the container after pre-curing or curing stage and weighing the decanted fluid.

Solidity Test:

A flat-tipped probe of about 6 mm diameter is placed on top of an advanced monomer mixture to create a pressure at the flat-tip of about 2.1 kPa (0.3 psi). The ease and penetration of the object into the gel was measured. The monomer mixture is considered solid when the object no longer penetrates or penetrates less than about 1 mm.

Viscosity:

At selected times, aliquots of approx. 5 ml are removed and placed in 8 dram vials. If the aliquots are above ambient temperature, the aliquots are then quickly cooled in wet ice to ambient temperature (approx. 24° C.). The aliquots are chilled in acetone/dry ice slush bath for approx. 10 minutes to a temperature of approx. −78° C. The warm aliquots may be chilled immediately to approx. −78° C. While the aliquots are kept cold, the viscosity is run using Brookfield Viscometer, Model RVTD equipped with a #6 Spindle (manufactured by Brookfield Engineering Lab, Stoughton, Mass.).

EXAMPLES 1–5 AND COMPARATIVE EXAMPLES 1–3

Monomer phase was prepared by combining styrene, dinvyl benzene and 2-ethylhexyl acrylate in a 20:20:60 by weight ratio. SPAN® 20 emulsifying agent was added as 12% by weight to the monomer solution. The mixture was vigorously shaken to dissolve the surfactant in the monomers. To a second batch of monomer phase containing SPAN® 20 emulsifying agent was added 1% by weight of monoolein (glycerol monooleate).

An Edge Sweets pin mill mixing machine incorporating a 1 hp motor belt driving a 6" long 1½" diameter pin mill with 12 layers of pins on the central rotor, 0.02" clearance between rotor and barrel, and fitted with flow meters and thermocouples for monitoring, was used to form the high internal phase water-in-oil emulsions. Oil phase (monomers and surfactants) were metered and controlled by a model 184-56C magnetic drive pump made by Micropump Corporation. Water phase flow was controlled by a similar pump of greater capacity (model 120-65C made by Micropump Corp.). The maximum oil flow in the configuration is 0.04 lbs/min; the maximum water phase (water, salt and potassium persulfate initiator) flow is 1.20 lbs/min. Control based on flow rates and/or pump RPM is provided by soft water in Eaton IDT FACTORY MATE control computer and an Allen-Brodley PLC-5 programmable logic controller.

A 10-gallon tank fitted with an air motor stirrer was used to mix aqueous internal phase. The oil phase was externally mixed by shaking or with a stirrer bar. The water phase was fed directly from mixing tank by the pump. The oil pump reservoir is a 1 liter steel tank.

In a typical run procedure, the pin mill is mounted and filled with oil phase. The flow of water and oil is started with the pin mill spinning typically at 2000 rpm. Typical conditions to establish emulsions are a water-to-oil feed ratio of 2:1 to 10:1 (i.e., low water-to-oil ratio), temperatures at mix heads of about 45°–50° C., feed rates of oil and water of 0.05 to 0.50 lbs/min, pin mill rotation rates of 1500 to 3000 RPM, emulsion flow rates of 0.3 to 1.2 lb/min, pin mill length of 6" to 18" and pin/barrel clearance of 0.05 t 0.02". Flow rate, pin mill length, pin/barrel clearance, RPM and temperature are adjusted to give the smoothest emulsions with most uniform back-pressure through the pin mill.

Following establishment of a smooth emulsion at low water-to-oil ration, the ratio was raised to the desired value by increasing the water flow and/or decreasing the oil flow. Changes are preferably made smoothly, with adjustment of all the above factors to give optimum emulsion quality.

The emulsion was let out of the pin mill mix-head through a static mixer to complete emulsion homogenation. After the desired emulsion conditions are reached, the emulsion was collected in 6 lb. sample containers at a flow rate of 0.3 to 1.20 lb/min. and cured in an oven at 60° C. for 18 to 24 hours.

When sweating of the emulsion occurred during increasing the water-to-oil ration, the flow rate was adjusted upward, RMP adjusted, and the water-to-oil ration was further increased until operation stabilizes at a uniform back-pressure with greater homogeneity. At this point, the emulsion is normally stabilized in a structure which will persist with low back-pressure throughout variations of the water-to-oil ratio and flow rates to desired levels.

A comparison of properties for foams made with and without cosurfactant is shown in Table 1 below with various water-to-oil ratios ("W:O RATIO").

TABLE 1

| EXAMPLE | W:O RATIO | 1/FD × 10³ | STRAIN @ 15 MIN | RTCD (g/g) | FD (g/g) | FS (g/g) | VWT (sec) | % RECOVERY |
|---|---|---|---|---|---|---|---|---|
| 1 | 25 | 22.4 | 6.3 | 19.9 | 44.6 | 20.9 | 314 | 25 |
| 2 | 30 | 27.9 | 11.4 | 23.7 | 35.8 | 25.8 | 112 | 30 |
| 3 | 35 | 32.6 | 35.5 | 22.2 | 30.8 | 31.5 | 146 | 22 |
| 4 | 40 | 38.2 | 64.9 | 15.5 | 26.2 | 36.1 | 231 | 17 |
| 5 | 45 | 44.2 | 66.7 | 16.0 | 22.7 | 41.1 | 209 | 15 |
| Comparative Examples: | | | | | | | | |
| 1 | 25 | 25.5 | 11.2 | 17.3 | 39.2 | 18.9 | 330 | 97 |
| 2 | 30 | 30.9 | 35.5 | 19.7 | 32.5 | 25.7 | 188 | 42 |
| 3 | 35 | 33.9 | 56.3 | 14.0 | 29.7 | 31.4 | 156 | 20 |

Addition of monoolein cosurfactant stabilizes the emulsion, as seen by higher achievable water-to-oil ratios in Table 1. Without cosurfactant, the maximum actual water-to-oil ratio (1/FD×1000) is approximately 35. With cosurfactant, emulsion up to a 45:1 ratio is achievable without emulsion degradation or breakage.

The foam properties were compared at the same actual water-to-oil ratio, which is determined to be (1/FD×1000). Comparison of foam properties at the same ratio shows that foams with 1% monoolein cosurfactant have an increased liquid capacity under load (RTCD). Stiffness and absorbance are comparable, as is wicking time. Addition of 1% monoolein also improves the ability of the foams to stay thin after drying. Thus, addition of 1% monoolein in this formulation gives an advantage in emulsion stability as seen by higher achievable water-to-oil ratios. The foam properties are also enhanced in larger capacity under load and smaller % recovery.

EXAMPLES 6-10 AND COMPARATIVE EXAMPLES 4-6

Monomer phase was prepared as in Examples 1-5 and Comparative Examples 1-3 except this time with 3% by weight monoolein added as cosurfactant. Emulsion and foams were prepared and worked up as described above. A comparison of foam properties is shown below in Table 2.

TABLE 2

| EXAMPLE | W:O RATIO | 1/FD × 10³ | STRAIN @ 15 MIN | RTCD (g/g) | FD (g/g) | FS (g/g) | VWT (sec) | % RECOVERY |
|---|---|---|---|---|---|---|---|---|
| 6 | 25 | 22.9 | 7.2 | 20.8 | 43.7 | 21.6 | 345 | 22 |
| 7 | 30 | 36.7 | 35.1 | 23.6 | 28.5 | 27.5 | 493 | 15 |
| 8 | 35 | 39.8 | 59.4 | 16.3 | 25.6 | 32.0 | 600 | 15 |
| 9 | 40 | 40.3 | 63.1 | 15.2 | 24.9 | 36.7 | 520 | 16 |
| 10 | 45 | 46.4 | 74.6 | 17.1 | 21.6 | 43.3 | 482 | 13 |

TABLE 2-continued

| EXAMPLE | W:O RATIO | 1/FD × 10³ | STRAIN @ 15 MIN | RTCD (g/g) | FD (g/g) | FS (g/g) | VWT (sec) | % RECOVERY |
|---|---|---|---|---|---|---|---|---|
| Comparative Examples: | | | | | | | | |
| 4 | 25 | 25.5 | 11.2 | 17.3 | 39.2 | 18.9 | 330 | 97 |
| 5 | 30 | 30.9 | 35.5 | 19.7 | 32.5 | 25.7 | 188 | 42 |
| 6 | 35 | 33.9 | 56.3 | 14.0 | 29.7 | 31.4 | 156 | 20 |

As can be seen from Table 2, addition of monoolein cosurfactant to the sorbitan monolaurate surfactant stabilizes the emulsion, as shown by the higher achievable water-to-oil ratio with the cosurfactant. Additionally, addition of monoolein produces a stiffer foam (lower % strain) with higher capacity under load (RTCD) and better thinness stability after drying (smaller % recovery). Wicking time (VWT) is somewhat longer with 3% monoolein than with 1% monoolein. However, the absorbance overall (FS) remains high.

EXAMPLES 11–15 AND COMPARATIVE EXAMPLES 7–9

Monomer phase were prepared as in examples 1–5 and Comparative Examples 1–3 except this time with the formulation 15:25:60 by weight ratio styrene:-divinylbenzene:2-ethylhexyl acrylate. SPAN ® 20 emulsifying agent was added as 15% by weight of the total monomer phase. A second batch of oil phase was made, with 1% by weight of monoolein added as cosurfactant. Emulsions and foams were prepared and treated as described above. A comparison of foam properties is described below for foams with and without the cosurfactant in Table 3.

TABLE 3

| EXAMPLE | W:O RATIO | 1/FD × 10³ | STRAIN @ 15 MIN | RTCD (g/g) | FD (g/g) | FS (g/g) | VWT (sec) | % RECOVERY |
|---|---|---|---|---|---|---|---|---|
| 11 | 30 | 27.7 | 5.7 | 25.1 | 36.1 | 26.2 | 351 | 30 |
| 12 | 35 | 34.1 | 10.0 | 29.2 | 29.3 | 31.6 | 278 | 25 |
| 13 | 40 | 38.8 | 21.0 | 31.0 | 25.8 | 36.6 | 240 | 20 |
| 14 | 45 | 44.8 | 43.3 | 26.6 | 22.3 | 41.6 | 181 | 20 |
| Comparative Examples: | | | | | | | | |
| 7 | 30 | 33.5 | 56.3 | 17.6 | 28.2 | 27.8 | 124 | 22 |
| 8 | 35 | 40.8 | 72.4 | 15.8 | 24.5 | 33.7 | 139 | 20 |
| 9 | 40 | 49.0 | 79.9 | 14.1 | 20.4 | 39.8 | 257 | 15 |

Addition of cosurfactant stabilizes the emulsion, as seen by the higher achievable water-to-oil ratio in Table 3. A comparison of the properties shows that addition of 1% by weight monoolein improves the strength of the foam materials (% strain), producing a stiffer foam which has greater resistance to compression. Material with cosurfactant has been fluid retention under load (RTCD) and higher absorbance (FS). However, vertical wicking times are somewhat slower in comparison to foams made without cosurfactant.

EXAMPLES 15–18 AND COMPARATIVE EXAMPLES 10–13

Monomer phase was prepared as in Examples 11–14 and Comparative Examples 7–9 except a combination of SPAN ® 40 emulsifying agents were used as the "control" emulsifier: 10% by weight SPAN ® 20 emulsifying agent and 5% by weight SPAN ® 40 emulsifying agent. The monomer phase was warmed briefly (~30 minutes) at 60° C. to effect complete dissolution of the surfactants. A second quantity of oil phase was prepared as described above. To it was added 1% by weight of monoolein. The resultant emulsions and foams were prepared and worked up as described previously. A comparison of the foam properties is shown in Table 4.

TABLE 4

| EXAMPLE | W:O RATIO | 1/FD × 10³ | STRAIN @ 15 MIN | RTCD (g/g) | FD (g/g) | FS (g/g) | VWT (sec) | % RECOVERY |
|---|---|---|---|---|---|---|---|---|
| 15 | 30 | 27.7 | 5.7 | 25.1 | 36.1 | 26.2 | 351 | 33 |
| 16 | 35 | 34.1 | 10.0 | 29.2 | 29.3 | 31.6 | 278 | 23 |
| 17 | 40 | 38.8 | 21.0 | 31.0 | 25.8 | 36.6 | 240 | 21 |
| 18 | 45 | 44.8 | 43.3 | 26.6 | 22.3 | 41.6 | 181 | 21 |
| Comparative Examples: | | | | | | | | |
| 10 | 30 | 34.5 | 6.23 | 25.6 | 32.9 | 27.2 | 540 | 25 |
| 11 | 35 | 38.0 | 19.2 | 30.4 | 26.3 | 34.7 | 562 | 20 |
| 12 | 40 | 42.7 | 21.0 | 32.5 | 23.4 | 38.8 | 425 | 22 |
| 13 | 45 | 45.7 | 37.0 | 27.1 | 21.9 | 40.8 | 430 | 20 |

Addition of sorbitan monopalmitate to the emulsifier package produces a stiffer foam in both cases, but with slower vertical wicking time. When monoolein cosurfactant is added, the foam properties remain comparable. One of the advantages in adding monoolein as cosurfactant is the decrease in the vertical wicking time.

EXAMPLES 19–22 AND COMPARATIVE EXAMPLES 14–16

Monomer phase was prepared as in examples 1–5 and Comparative Examples 1–3 except 10% by weight SPAN ® 20 emulsifying agent and 2% by weight monoolein were added to the combined monomers. Emulsion and foams were prepared and worked up as described previously. Foam properties are compared below for foams with and without cosurfactant in Table 5.

TABLE 5

| EXAMPLE | W:O RATIO | 1/FD × 10³ | STRAIN @ 15 MIN | RTCD (g/g) | FD (g/g) | FS (g/g) | VWT (sec) | % RECOVERY |
|---|---|---|---|---|---|---|---|---|
| 19 | 25 | 24.3 | 5.3 | 21.0 | 41.2 | 21.8 | 561 | 25 |
| 20 | 30 | 28.6 | 5.70 | 23.9 | 35.0 | 24.9 | 418 | 26 |
| 21 | 35 | 33.1 | 11.7 | 27.6 | 30.3 | 30.0 | 480 | 24 |
| 22 | 40 | 45.1 | 45.5 | 24.8 | 23.2 | 37.0 | 256 | 22 |
| Comparative Examples: | | | | | | | | |
| 14 | 25 | 25.5 | 11.2 | 17.3 | 39.2 | 18.9 | 330 | 97 |
| 15 | 30 | 30.9 | 35.5 | 19.7 | 32.5 | 25.7 | 188 | 42 |
| 16 | 35 | 33.9 | 56.3 | 14.0 | 29.7 | 31.4 | 156 | 20 |

As seen from Table 5, foams prepared with monoolein as a portion of the total surfactant system show increased strength, increased capacity under load and increased absorbency. They also show enhanced thinness stability after drying. The time for vertical wicking is somewhat lengthened by addition of monoolein.

EXAMPLES 23–25 AND COMPARATIVE EXAMPLES 17–19

Monomer phase was prepared as in examples 1–5 and Comparative Examples 1–3 except SPAN ® 20 emulsifying agent was added as 8% by weight and monoolein as 4% by weight. Emulsions were prepared and foams worked up as previously described. A comparison of foam properties is given below for foams made with and without cosurfactant in Table 6.

TABLE 6

| EXAMPLE | W:O RATIO | 1/FD × 10³ | STRAIN @ 15 MIN | RTCD (g/g) | FD (g/g) | FS (g/g) | VWT (sec) | % RECOVERY |
|---|---|---|---|---|---|---|---|---|
| 23 | 28 | 27.0 | 11.6 | 20.5 | 37.1 | 22.1 | 83 | 100 |
| 24 | 32 | 31.6 | 15.6 | 22.0 | 33.4 | 24.6 | 131 | 67 |
| 25 | 36 | 32.1 | 30.1 | 23.4 | 31.1 | 28.8 | 125 | 32 |
| Comparative Examples: | | | | | | | | |
| 17 | 25 | 25.5 | 11.2 | 17.3 | 39.2 | 18.9 | 330 | 97 |
| 18 | 30 | 30.9 | 35.5 | 19.7 | 32.5 | 25.7 | 188 | 42 |
| 19 | 35 | 33.9 | 56.3 | 14.0 | 29.7 | 31.4 | 156 | 20 |

As can be seen from Table 6, a comparison of the foam properties again shows increased strength in the material when monoolein is a component in the surfactant system. There is increased liquid retention under load as well as rapid wicking time.

COMPARATIVE EXAMPLE 20

Oil phase was prepared by combining styrene, divinyl benzene and 2-ethylhexyl acrylate in a 2:2:6 ratio. To it was added 12 phr of glycerol monolaurate. Water phase consisted of an aqueous solution of 10% calcium chloride and 0.15% potassium persulfate. Water and oil phases were combined under shear with a teflon coated paint mixer in a polyethylene cup at 200 rpm. Water and oil phases were combined to give a 30:1 water:oil ratio emulsion. The emulsion was then poured into a polyethylene tub and heated for 18 hours at 60° C. The emulsion broke upon heating and no polymeric foam was produced:

In the above Examples, glycerol monofatty acid ester cosurfactants were added to a primary surfactant to prepare stable high internal phase water-in-oil emulsions. Addition of monoolein as a cosurfactant to either SPAN® 20 or SPAN® 20+40 emulsifiers lead to a more stable emulsion, and improved foam properties in the cured emulsion to produce a material suitable to be a high absorbant. Glycerol monolaurate, a glycerol monofatty acid ester, was not an effective surfactant by itself for production of the HIPE which is stable during curing. In some of the formulations, the stability of the emulsion was enhanced by addition of monoolein as a cosurfactant. Addition of monoolein can stabilize the emulsion such that a higher water-to-oil ratio is achievable before the emulsion degrades or completely breaks. Higher ratio emulsions are desirable in that their overall capacity is increased, making foams with higher fluid absorption capability.

Upon curing the emulsions, the resultant foams can show properties which are more favorable for producing absorbant polymeric foams. In making an absorbant polymeric foam, a desirable material would have high absorbency (FS), close to the actual water-to-oil ratio. A good absorbant would also have high capacity under load (RTCD) as well as rapid vertical wicking time (VWT). Finally, such an absorbant would have low % strain, indicating a strong material. Comparing foams made with and without monoolein cosurfactant, improvements are seen in some or all foam properties when cosurfactant is added. Changes in stiffness and absorbency are observed by addition of a cosurfactant. In most cases, the foam which resulted from addition of a glycerol monofatty acid cosurfactant to the surfactant system produced a foam which overall as properties more favorable for an absorbant polymeric foam. In particular, addition of monoolein from 1–3% improves emulsion stability and gives favorable foam properties.

I claim:

1. A curable water-in-oil emulsion composition comprising:
   (a) a mixture of polymerizable monomers comprising at least one oil-soluble vinyl monomer and from about 2 to about 70 weight percent, based on the mixture, of a multifunctional unsaturated crosslinking monomer;
   (b) at least 90 weight percent, based on the emulsion, of water as the internal phase;
   (c) an effective amount of a surfactant comprising (i) one or more sorbitan fatty acid ester, saccharide fatty acid ester or a mixture thereof and (ii) at least one glycerol fatty acid ester to produce an water-in-oil emulsion, and
   (d) an effective amount of a polymerization initiator to polymerize and crosslink the polymerizable monomers.

2. The composition process of claim 1 wherein the glycerol monofatty acid ester is a glycerol monofatty acid having a $C_8$–$C_{30}$ ester group.

3. The composition of claim 2 wherein the glycerol monofatty acid ester is a glycerol monofatty acid ester substituted with at least one insert substituent on the ester group.

4. The composition of claim 2 wherein the glycerol monofatty acid ester is selected from the group consisting of glycerol monooleate, glycerol monopalmitate, glycerol monolaurate, glycerol monostearate, glycerol monoricinoleate, and mixtures thereof.

5. The composition of claim 1 wherein the ratio of component (i) to component (ii) is within the range of from about 20:1 to about 1:1.

6. The composition of claim 5 wherein the surfactant is present in an amount from about 0.1 to about 40 weight percent based on the polymerizable monomers.

* * * * *